Jan. 17, 1956
O. KILTIE
2,731,591
VOLTAGE REGULATOR
Filed Feb. 23, 1952
FIG.1.
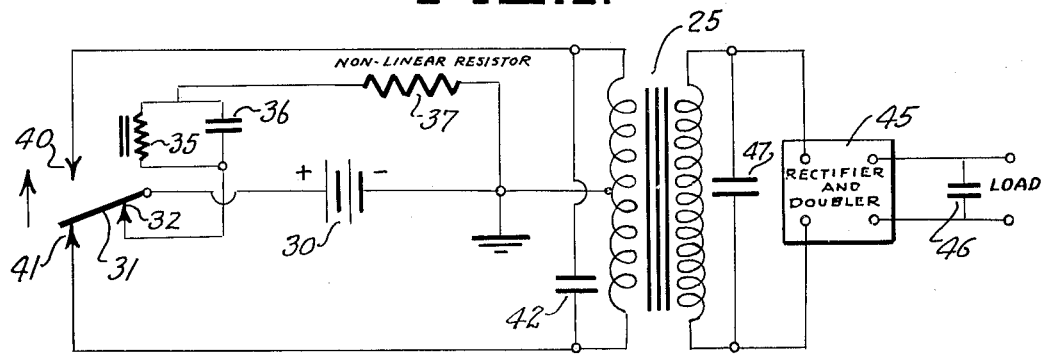
FIG.2.
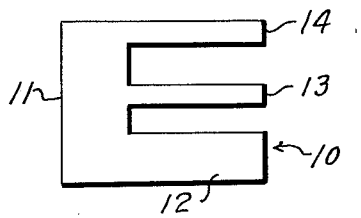
FIG.3.
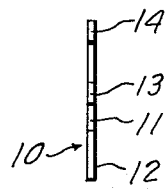
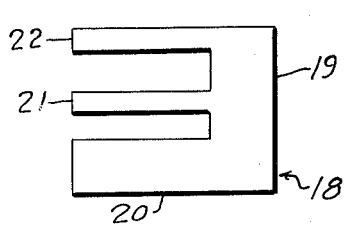
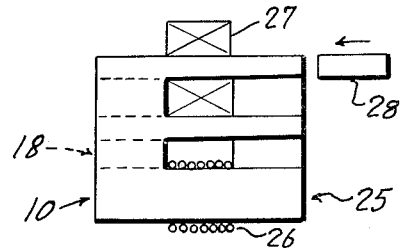
FIG.4.
FIG.5.
INVENTOR.
Ordean Kiltie
BY
ATTORNEYS

United States Patent Office 2,731,591
Patented Jan. 17, 1956

2,731,591

VOLTAGE REGULATOR

Ordean Kiltie, Fort Wayne, Ind., assignor to Ballastran Corporation, Fort Wayne, Ind., a corporation of Indiana Application February 23, 1952, Serial No. 272,943

4 Claims. (Cl. 321—49)

This invention relates to a voltage regulator, and, more particularly, to a voltage regulator for use with a battery supply and capable of delivering an approximately constant voltage notwithstanding substantial changes in either the applied battery voltage or in load or both.

Because of the gradual decrease in available voltage as a battery deteriorates with use, difficult problems must be solved if a battery is to be used as the power source in electrical applications requiring constant D. C. voltage.

The present invention is based upon the discovery of a circuit and aparatus capable of delivering a virtually constant D. C. voltage as an applied alternating voltage from a battery powered vibrator varies by about 25 per cent, and as the load varies from approximately one-half load to full load.

It is, therefore, the principal object of the invention to provide a voltage regulator circuit that delivers a substantially constant D. C. voltage regardless of substantial changes in applied voltage and in load.

Other objects and advantages are apparent from the description which follows, and from the accompanying drawings, in which:

Fig. 1 is a schematic wiring diagram showing a voltage regulating circuit of the invention energized by a battery powered vibrator;

Fig. 2 is an elevation showing one shape of a core lamination suitable for use in constructing a transformer for use in a voltage regulating circuit of the invention;

Fig. 3 is an end view of the core lamination of Fig. 2;

Fig. 4 is an elevation of a core lamination that cooperates with the lamination of Figs. 2 and 3 to form a core; and Fig. 5 is a schematic diagram of a transformer constructed on the laminations of Figs. 2 and 4.

Referring now to the drawings, Figs. 2 and 3 show a core lamination 10 for the construction of a transformer for use in a voltage regulator of the invention. The lamination 10 is generally E-shaped, and has a vertical leg 11 and a horizontal leg 12 each of about one inch width, and two horizontal legs 13 and 14 each of about 7/16" width. The lamination 10 is made of a cold reduced, grain-oriented silicon steel having its grain direction parallel to the longest dimension of the magnetic path, and is approximately .014 inch thick. Steels sold under the trade names "Silectron" and "Armco 3X" are suitable. Best regulation is obtained using one of the named steels oriented as indicated. These materials saturate at a high flux density and provide a sharp knee at saturation. Nickel alloy steels can be used with good results, but are expensive, and, because they saturate at low flux density, physically large transformers are necessary using such steels. The lengths of the legs 11, 12, 13, and 14 are relatively immaterial, so long as the desired number of turns can be provided for a primary and a secondary winding.

A core lamination indicated generally as 18 in Fig. 4 is identical with the lamination 10 except that it is a reversed image thereof. The lamination 18 is composed of a vertical leg 19, and horizontal legs 20, 21 and 22, and is used in conjunction with the lamination 10 to form a core for a transformer used in a voltage regulator of the invention.

A transformer indicated generally as 25 in Fig. 4, has a core composed of laminations 10 alternated, preferably successively, with laminations 18. In one specific embodiment of the invention for a particular application the transformer has been provided with a primary winding 26 of 218 turns of No. 28 wire, and a secondary winding 27 of 27,000 turns of No. 42 wire. The output voltage level is determined by the number of turns in the secondary coil, and by the flux in the secondary core leg. Since this core leg is saturated, the output voltage level can be raised by inserting a movable magnetic shunt 28 into the center of the secondary coil. The voltage remains constant at the new level with change in battery voltage or with variations in load, or both. The secondary winding is spaced from the leg of the core formed by the legs 14 and 22 of the laminations 10 and 18 to allow the adjustable insertion of the movable magnetic shunt section 28. By using multiple magnetic sections 28 the output voltage level can be varied by any desired increments between the design limits. As appears in the schematic representation of the transformer 25 of Fig. 1, the primary coil 26 is wound double, and each primary winding is grounded at one end; the grounded ends of the primary windings are at opposite sides of the core. This is a bifilar winding, and serves to minimize leakage reactance between each half of the coil and to provide balanced conditions to the core and to the secondary coil. The output voltage level from the circuit of the invention varies less than 5% with simultaneous changes from full load to half load, and variation between about 20 and about 30 volts D. C. in a battery 30 which energizes the circuit.

The battery 30 has its negative terminal connected to ground and to the grounded taps of the transformer 25. The positive terminal of the battery 30 is connected to a resilient armature 31 which, when at rest, contacts a point 32 to close a vibrator circuit. The vibrator circuit comprises a solenoid 35 and a condenser 36 connected in parallel, and in series with a non-linear resistor 37 to ground. When the vibrator circuit is closed by contact between the armature 31 and the point 32, as shown in Fig. 1, the solenoid 35 is energized, and urges the armature in the direction of the arrow. The solenoid 35 is selected so that it draws approximately one-half of the battery voltage; the non-linear resistor 37, which may be an "Amperite" current regulator, drops the rest of the battery voltage. The non-linear resistor 37 draws less current, i. e., has a higher resistance, when the current is low than when the current is high; therefore, the current through the solenoid 35 is approximately constant regardless of the condition of the battery 30, and the frequency of vibration is, thus, substantially constant. The condenser 36 provides a low impedance parallel path to divert harmonic currents that would otherwise go through the solenoid 35, and thereby stabilizes the current in the solenoid. Upon movement of the armature 31, contact between it and the point 32 is broken, and the solenoid 35 de-energized; the inertia of the armature carries it to contact with a point 40, and its resilience returns it to the position shown in Fig. 1, in contact with the point 32, and a point 41, whereupon the cycle is repeated. The vibrator circuit described has been found to maintain approximately constant the frequency of the oscillating circuit; slight variations in the current therein can be tolerated, as the mechanical characteristics, resilience and mass of the oscillating armature control the rate unless the variation is great.

When the armature contacts the point 41 a current flows from the battery 30 and through one winding of the primary of the transformer to ground. When the armature contacts the point 40 a current flows through the other primary winding of the transformer 25, in the opposite direction, to ground. A capacitor 42 is positioned in parallel across the primary 26 of the transformer to suppress arcing between the armature and the contact points 40 and 41. The armature and vibrator circuit provide a substantially constant number of cycles per second, regardless of the condition of the battery 30. The current flowing through each half of the primary winding of transformer 25 is maintained substantially constant by reason of the compensation of the special core laminations 10 and 18 and by a capacitor 47 as hereinafter described.

Provision is made in the transformer 25 to compensate for variations in terminal voltage of the battery 30 from about 30 volts to about 20 volts: the normal variation from the fresh to the exhausted state. The flux induced by the primary in the core leg composed of the legs 12 and 20 of the laminations 10 and 18 is a direct function of the terminal voltage of the battery 30. The core legs composed of the legs 11 and 19 are each capable of carrying all of the flux induced when the terminal voltage is about 30 volts, and, therefore, as it decreases to about 20 volts. The core legs formed by the legs 13 and 21, and 14 and 22, however, are of such size that they become saturated successively, and in the order named, even when the terminal voltage of the battery 30 is about 20 volts. Therefore, the voltage induced in the secondary of the transformer 25 is a maximum when the terminal voltage of the battery 30 is about 20 volts, and does not vary appreciably if this terminal voltage is increased from 20 volts to as much as 30 volts.

The constant voltage induced in the secondary is rectified and may, if desired, be doubled, by a standard voltage doubler and rectifier 45 which may be generally of any suitable type such as shown at page 211 of "Handbook of Industrial Electronic Circuits," Markus and Zeluff, McGraw-Hill, New York, 1948.

In the specific embodiment of the invention, the filament voltage for the rectifiers was taken from windings which were a part of transformer 25. The windings were placed directly over and insulated from the outside of the high voltage secondary coil and each winding included 6 turns of No. 28 wire so placed. The filament voltage was thus also a regulated voltage since it was taken from that portion of the circuit in which the voltage is substantially constant.

A capacitor 46 is placed across the outlet from the doubler and rectifier to smooth the voltage characteristics. A capacitor 47 is placed across the secondary of the transformer 25, and is selected to match the leakage reactance of the transformer. Since the leakage reactance of the transformer is matched by the reactance of the capacitor, but a phase difference of about 180° exists between them, the voltage across them will remain essentially constant. The reactance does not change appreciably because core legs 14 and 22 are saturated. The present form of the secondary circuit also causes the battery current in the vibrator circuit and in the points 40 and 41 to be reducing at the time contact is broken rather than to be increasing from zero at that point.

Because two legs of the core of the transformer 25 are saturated in normal operation the transformer generates appreciable heat, and must withstand substantial temperatures. Accordingly, it is desirable that it be potted and sealed with a high temperature plastic material such as a polyfluorethylene or a silicone and a refractory cement. Such a potted and sealed transformer has extremely low air losses, and does not deteriorate in use. However, it is possible to employ a conventional transformer designed as described herein, and the invention, in its broader aspects, is not limited to the use of the novel transformer.

The following table presents experimental results which show the excellent control achieved by the voltage regulator of the invention. The table presents data obtained with the precise transformer described above, potted and sealed as set forth in the copending application identified.

| Terminal Voltage, Battery 30 | Microamperes in Load Circuit | Kilovolts available in load circuit |
| --- | --- | --- |
| 23 | 45 | 12.67 |
| 23 | 97 | 12.30 |
| 30 | 46 | 12.80 |
| 30 | 100 | 12.60 |

It will be apparent from the above discussion that a transformer having the characteristics set forth for the transformer 25 is an essential feature of the voltage regulator of the invention. However, the invention is not limited to the precise dimensions and windings stated, as any transformer can be used in the circuit providing the relative reluctances of the primary core leg, of the shunt core leg, and of the secondary core leg are such that the last two legs are saturated by the flux set up by the primary current flow when the applied voltage is the minimum the transformer is designed to accommodate. It is preferred that all portions of the core except the shunt and that on which the secondary is wound should operate below flux saturation so that the induced E. M. F. can be raised by the provision of an additional flux path in the secondary core leg.

It will also be apparent that any alternating current source having an approximately constant frequency can be substituted for the battery 30 and the vibrator arrangement shown in Fig. 1.

The invention is not limited to the precise features shown, as substantial alterations and modifications can be made without departing from the spirit of the claims.

Having described the invention, I claim:

1. In combination, a transformer provided with a closed core having primary and secondary leg portions and a magnetic shunt around said secondary leg portion, a primary winding energizable by an alternately connected direct current source variable from a maximum to a minimum voltage and being wound on said primary leg portion, and a secondary winding wound on said secondary leg portion, the relative reluctance of said portions of the closed core being such that the secondary portion and the shunt portion are saturated by the current flowing in the primary winding when the direct current source provides its minimum voltage, and a vibrator actuated by current flowing from one terminal of the direct current source through a nonlinear resistor to the other terminal of the direct current source and periodically interrupting the direct current flowing to said primary winding of said transformer.

2. In a voltage regulator for delivering a substantially constant voltage direct current comprising a low voltage direct current source having a voltage fluctuating between a maximum and a minimum, a transformer energized by the low voltage direct current source, a vibrator for interrupting the flow of current from the source to the transformer and a voltage rectifier energized by the voltage induced in the secondary of the transformer, the improvement which consists in the combination of a transformer provided with a closed core having primary and secondary leg portions and a magnetic shunt around said secondary leg portion, a primary winding energized by the direct current source and being wound on said primary leg portion, and a secondary winding wound on said secondary leg portion, the relative reluctance of said portions of the closed core being such that the secondary portion and the shunt portion are saturated by the current flowing in the primary winding when the direct current source provides its minimum voltage, and a vibrator actuated by current flowing from one terminal of the direct current source through a nonlinear resistor to the other terminal of the direct current source and periodically interrupting the direct current flowing to said primary winding of said transformer.

3. In combination, a transformer provided with a closed core having primary and secondary leg portions and a magnetic shunt therebetween, a primary winding energizable by an alternately connected direct current source variable from a maximum to a minimum voltage and being wound on said primary leg portion, and a secondary winding wound on said secondary leg portion, the relative reluctance of said portions of the closed core being such that the secondary portion and the shunt portion are saturated by the current flowing in the primary winding when the source provides minimum voltage, a vibrator actuated by said direct current source and alternately connecting said direct current source to said transformer primary, and means to maintain said vibrator at a substantially constant frequency of vibration.

4. In combination, a transformer provided with a closed core having primary and secondary leg portions and a magnetic shunt therebetween, a primary winding around said primary leg portion, a secondary winding around said secondary leg portion, an alternately connected direct current source varying between a predetermined maximum voltage and a predetermined minimum voltage, the relative reluctance of said portions of the closed core being such that the secondary portion and the shunt portion are saturated by the current flowing in the primary winding when the alternately connected source provides its minimum voltage, and means to cause the frequency of alternation of connection of said direct current source to said transformer primary to be maintained substantially constant.

References Cited in the file of this patent

UNITED STATES PATENTS

| | | |
|---|---|---|
| Re. 21,116 | Wirz | June 13, 1939 |
| 1,921,461 | Garstang | Aug. 8, 1933 |
| 1,940,496 | James | Dec. 19, 1933 |
| 2,435,515 | Rosser | Feb. 3, 1948 |